United States Patent
Laaser

(10) Patent No.: US 12,499,358 B1
(45) Date of Patent: *Dec. 16, 2025

(54) METHODS OF GENERATING AUXILARY FUNCTIONS FOR USE WITH MACHINE LEARNING METHODS

(71) Applicant: INTUIT INC., Mountain View, CA (US)

(72) Inventor: William T. Laaser, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 2227 days.

This patent is subject to a terminal disclaimer.

(21) Appl. No.: 15/987,566

(22) Filed: May 23, 2018

(51) Int. Cl.
*G06N 3/08* (2023.01)
*G06F 17/16* (2006.01)

(52) U.S. Cl.
CPC ............... *G06N 3/08* (2013.01); *G06F 17/16* (2013.01)

(58) Field of Classification Search
CPC .................................. G06N 3/08; G06F 17/16
See application file for complete search history.

(56) References Cited

U.S. PATENT DOCUMENTS

| | | | | |
|---|---|---|---|---|
| 9,524,567 B1 * | 12/2016 | Brokish | ............... | A61B 6/5205 |
| 2011/0231348 A1 * | 9/2011 | Xiao | ....................... | G06N 20/00 706/12 |
| 2016/0033661 A1 * | 2/2016 | Bansal | .................... | G01V 1/306 703/2 |
| 2019/0266573 A1 * | 8/2019 | Radhakrishnan | ..... | G06F 16/383 |
| 2019/0355149 A1 * | 11/2019 | Avendi | ....................... | G06T 7/74 |

OTHER PUBLICATIONS

Shang, Yi , "Global optimization for neural network training," IEEE, (Year: 1996) (Year: 1996).*
Wisdom, Scott, "Full-Capacity Unitary Recurrent Neural Networks," arxiv, (Year: 2016).*
Wen Wei, "TernGrad: Ternary Gradients to Reduce Communication in Distributed Deep Learning," arxiv, (Year: 2017).*
Stratos, Karl, "On Logistic Regression: Gradients of the Log Loss, Multi-Class Classication, and Other Optimization Techniques," (Year: 2018).*
Rodriguez-Quinonez Julio C., "Signal Processing," Elsevier, (Year: 2012).*
Ordin et al., "A heuristic algorithm for solving the minimum sum-of-squares clustering problems", 2015 (Year: 2015).*
Chen et al., "Accelerated Gradient Method for Multi-task Sparse Learning Problem", 2009 (Year: 2009).*

* cited by examiner

*Primary Examiner* — George Giroux
(74) *Attorney, Agent, or Firm* — Patterson + Sheridan, LLP

(57) ABSTRACT

Certain aspects of the present disclosure provide techniques for optimizing a cost function of a deep learning algorithm. One example method generally includes executing, via a processing apparatus, the machine learning model, wherein the machine learning model can be optimized using gradient descent and evaluating output of the machine learning model using a cost function. The method further involves determining a gradient of the cost function and generating an auxiliary function based on the gradient. The method further involves identifying a root of the auxiliary function corresponding to a minimum point of the cost function, wherein calculation of the root is numerically stable and updating the machine learning model based on the root of the auxiliary function.

13 Claims, 5 Drawing Sheets

US 12,499,358 B1

METHODS OF GENERATING AUXILARY FUNCTIONS FOR USE WITH MACHINE LEARNING METHODS

INTRODUCTION

Aspects of the present disclosure relate to generating auxiliary functions used for machine learning applications, and in particular to generating auxiliary functions that reduce the complexity of finding local minimum points of cost functions related to machine learning models.

Machine learning continues to grow in importance and applicable situations. One example application for machine learning is the identification of subjects in images. For example, machine learning may be used to classify a particular image by what the image displays.

Machine learning algorithms, such as deep learning algorithms, may use a cost function to assess the quality of a resulting model. In this context, the "cost" (or "loss" as it is often alternatively referred to as) is a measure of the error in the model. In such cases, machine learning training techniques seek to minimize the error of a model by adjusting input variables (e.g., parameters) to find a minimum, or at least a local minimum, of the cost function.

Cost functions, however, typically have multiple inputs, which complicates the process of finding minimum points quickly and easily. Conventional methods for finding cost function minimum points include first-order techniques such as gradient descent, which iteratively estimates and approaches a local minimum of a cost function by moving along the gradient of the cost function using a set step size. However, gradient descent is often an inefficient method because a small step size is often used to avoid overshooting a local minimum, which means a large number of steps are frequently required to reach the local minimum point. The need for small step sizes in conventional gradient descent methods greatly increases the processing resources used while optimizing the cost function. Further, existing methods for optimizing gradient descent, such as using second-order information, are computationally expensive and numerically unstable.

Accordingly, methods are needed to identify local minimum points of machine learning cost functions more rapidly while concurrently using fewer processing resources and without introducing computational errors.

BRIEF SUMMARY

Certain embodiments provide a method for optimizing a machine learning model. The method generally includes executing, via a processing apparatus, the machine learning model, wherein the machine learning model can be optimized using gradient descent and evaluating output of the machine learning model using a cost function. The method further involves determining a gradient of the cost function and generating an auxiliary function based on the gradient. The method further involves identifying a root of the auxiliary function corresponding to a minimum point of the cost function, wherein calculation of the root is numerically stable and updating the machine learning model based on the root of the auxiliary function.

In other embodiments, an apparatus may be configured to perform the aforementioned method for optimizing a machine learning model. In yet other embodiments, a non-transitory, computer-readable may comprise instructions for performing the aforementioned method for optimizing a machine learning model. Other embodiments are possible as described in further detail, below.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
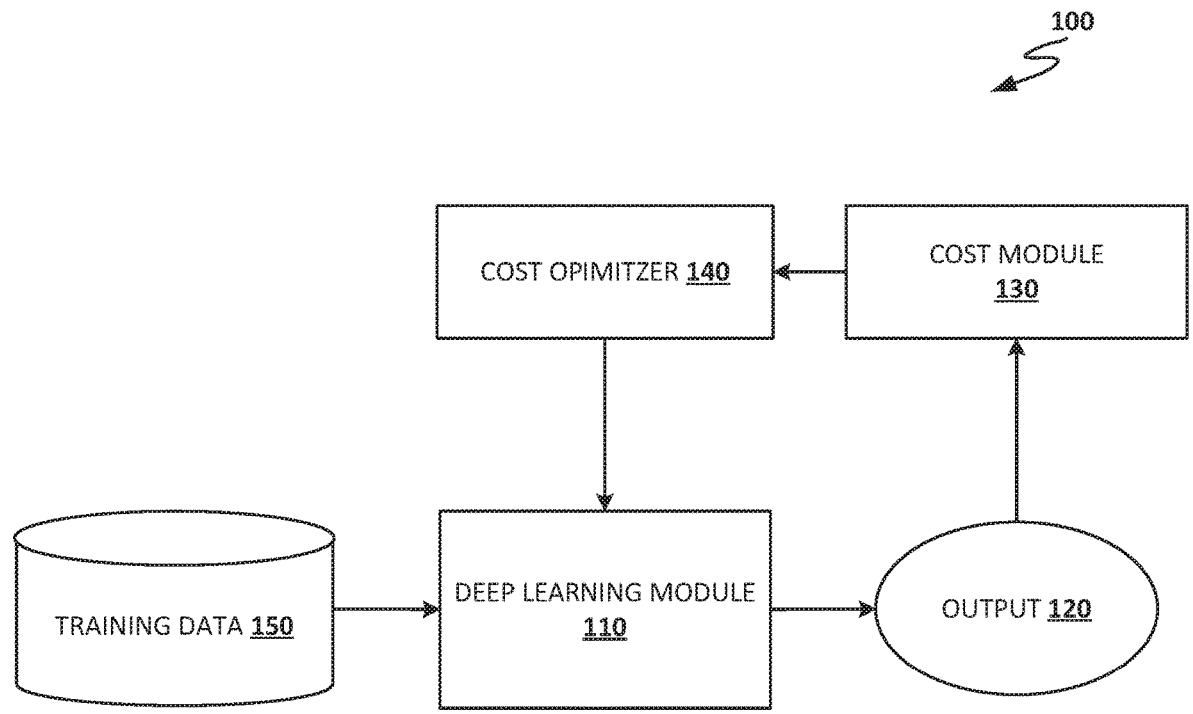
FIG. 1 is a block diagram of components of a deep learning system.

Aspects of the present disclosure provide apparatuses, methods, processing systems, and computer readable mediums for generating auxiliary functions that reduce the complexity of finding local minimum points of cost functions related to machine learning models.

Generally speaking, machine learning models need to be trained before being deployed for their intended purpose. A cost function may be used to assess the quality of a current iteration of a machine learning model as it is being trained, and to determine when training is complete or otherwise sufficient. In such cases, machine learning model training techniques seek to minimize a "cost" or "loss" associated with a cost model associated with the machine learning model. One way to minimize the cost or loss associated with the cost function is to determine input variables (e.g., parameters) that minimize the cost function.

Cost functions for deep learning models often take multiple input variables (e.g., parameters) of the deep learning model as input. In some cases, the cost function may have hundreds, thousands or even millions of parameters depending on the design and complexity of the deep learning model. Thus, finding a minimum point of a multi-variable cost function may be a very difficult computation. Directly optimizing the cost function (e.g., by directly deducing the value of parameters that minimize the cost function) is generally not performed. Instead, techniques such as gradient descent are often used because of the relative simplicity of the method.

Gradient descent enables local minimum points to be determined by using iterative computations of the gradient of the cost function. Generally, small steps are made in the computations to approximate minimum points of the cost function. As a machine learning model iterates, it gradually converges towards a point where further tweaks to the parameters produce little or zero changes in the cost. Gradient descent remains widely used despite the fact that gradient descent optimization often uses more processing resources than desirable, due in large part to the many iterations needed to locate minimum points. Although a single instance of gradient descent optimization may be relatively short, in deep learning systems where such optimization may be performed many times, the aggregate effect of this processing inefficiency amounts to deep learning model training taking very long times to complete.

One alternative to the conventional gradient descent method involves using second-order techniques to identify minimum points. One such second-order technique is the multiple-variable version of Newton's method, which can be used to determine a minimum point based on a gradient of a cost function at a given point. In particular, by using a Jacobian matrix of the gradient (also known as a Hessian of the cost function), a formula may be constructed to obtain a better estimate of a local minimum of the cost function. However, this method involves inverting the Jacobian matrix, which is both computationally expensive and numerically unstable. In this case, numerical instability refers to errors introduced into calculations because of an accumulation of small rounding errors.

Because computer processors have a finite amount of memory to store numbers for calculations, all but the simplest calculations tend to involve rounding numbers. In a complicated set of calculations, like matrix inversion (especially for large matrices such as Jacobian matrices for cost functions), small error rounding at every step along the way can result in a final computation differing greatly from the correct computation. As deep learning systems are by their nature computerized, any potential optimization method relying on inverting a matrix may result in numerical instability for cost function optimization and thus corrupt results.

A solution to the problem described above with respect to conventional methods is to find local minimum points of cost functions by calculating the roots of a derived auxiliary function, which is based on a gradient of the cost function, but which has a single output (e.g., a scalar value) in contrast to the gradient, which has multiple outputs (e.g., is a vector value). A root of a function refers to an input to the function that produces an output of zero. Roots of the auxiliary function correspond to points where the cost function has a gradient of zero. For example, the auxiliary function may be an inner product (e.g., dot product) of the gradient of the cost function. A modified Newton's method may then be applied to the auxiliary function to identify roots of the auxiliary function. Because the cost function has a gradient of zero at minimum points, the auxiliary function may be used to find local minimum points of the cost function without the inherent complexity of finding roots of the gradient function (e.g., by the second-order method discussed above). This solution is readily applicable to machine learning model optimizations, including deep learning model optimization, as well as other computational problems where second-order methods are ideally avoided for complexity and stability reasons.

For example, in a deep learning system, estimated roots of an auxiliary function may be used to update parameters used in the machine learning system. In some cases, the roots of the auxiliary function are found using a modified Newton's method, which results in a method of training the machine learning model that beneficially uses fewer processing resources, maintains numerical stability, and runs more quickly than conventional methods, as described above.

Thus, advantages of the disclosed systems over conventional machine learning optimization include a reduction in processing resources compared to conventional gradient descent-based optimization or other methods for finding minimums of functions having multiple inputs. While conventional gradient descent relies on a large number of iterations of calculating a cost function to find an approximate local minimum, the methods described herein use an improved calculation that better predicts where a local minimum point is, hence significantly reducing the number of iterations required to find a local minimum point. This improvement in conventional practices saves processing resources used on any particular optimization instance, and in aggregate can save a great deal of time and resources when training a machine learning model. Further, the methods described herein are numerically stable, and thus produce results that can be relied upon, unlike conventional cost function optimizations that rely on second-order techniques to identify minimum points of a cost function.

FIG. 1 is a block diagram of components of a deep learning system 100. Deep learning system 100 is a conventional deep learning system using conventional methods of training and optimization. Deep learning system 100 includes deep learning module 110, output 120, cost module 130, cost optimizer 140 and training data 150. Deep learning module 110 generally processes training data, such as from training data 150, to identify patterns in the training data to facilitate subsequent prediction or classification of data. Training deep learning module 110 involves a system of feedback based on output 120 of deep learning module 110.

Output 120 is produced by deep learning module 110 while processing training data 150. Output 120 is evaluated by cost module 130 to determine a cost, which is representative of the quality of output 120 relative to the expected or "correct" output for a given set of training data. Although output may be measured in "cost," the term "loss" is also frequently used to refer to the quality of output measured. Cost optimizer 140 analyzes cost module 130 to determine a minimum point for cost module 130. A value used as input to cost module 130 resulting in a minimum point of output for cost module 130 can in-turn be used to adjust parameters of deep learning module 110. Cost optimizer 140 operates to determine minimum points of cost module 130 and to modify deep learning module 110 accordingly.

Deep learning system 100 may work iteratively (e.g., in a loop) to continually refine deep learning module 110, for example, based on determining local minimum points of cost module 130. In conventional deep learning systems, a plurality of such loops and refinements may need to be made in order for a deep learning model to reach an acceptable quality of output. Because of the number of iterations that may be needed to fully train a deep learning model, small increases in processing time for a given optimization loop may, in the aggregate, amount to a significant increases in processing time and resources needed to train the deep learning model.

For example, conventional gradient descent-based optimization relies on performing many iterations of an optimization function. A small step size in gradient descent means more steps to find a local minimum, which in-turn means more processing time needed. While the solution to this conventional problem may seem to be making the step size larger, a larger step size may go past the intended optimization point and may eliminate any gains in processing time associated with the larger step size. The improved method described herein saves on processing time by producing improved estimations of the step size.

Figure 2:
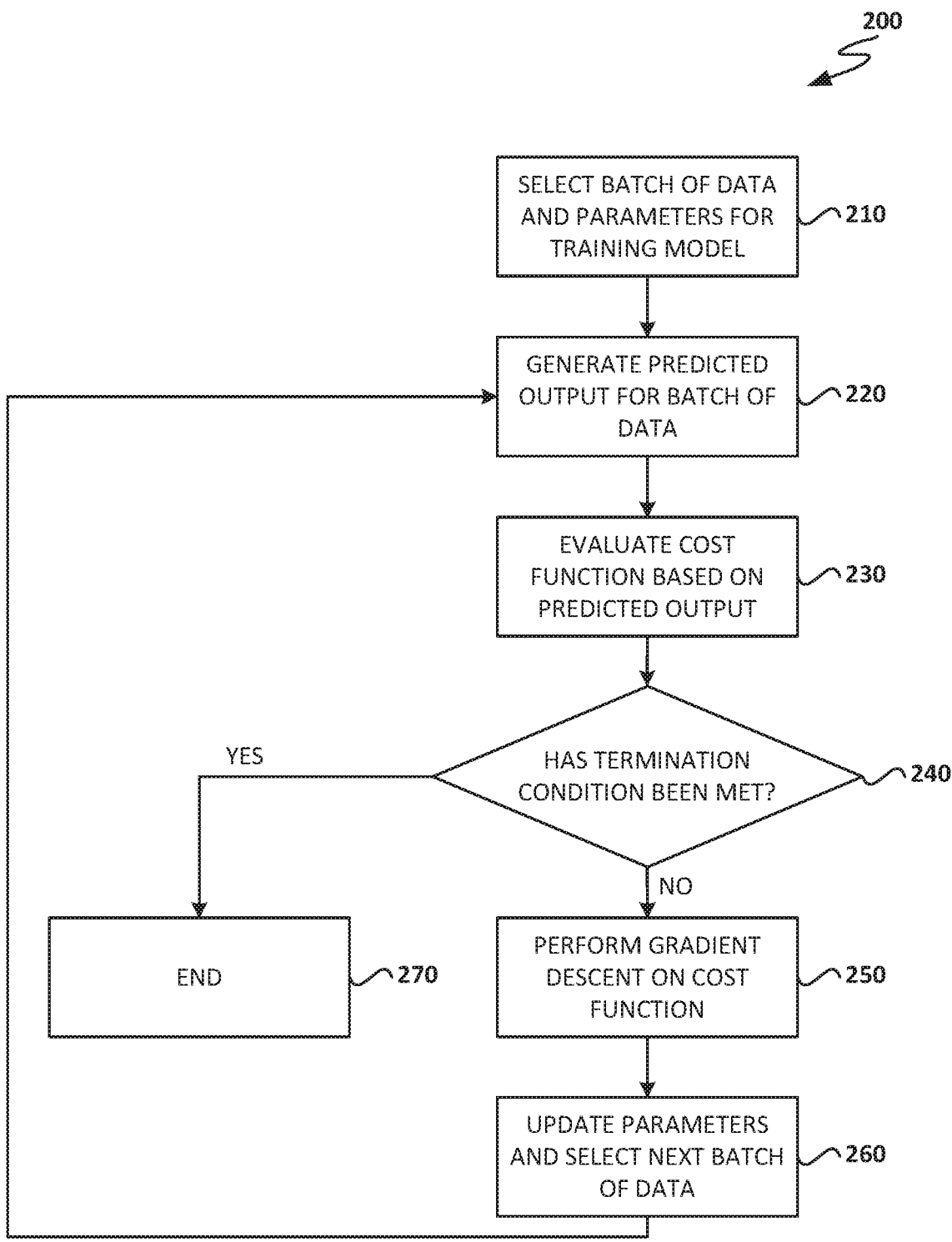
FIG. 2 is a flow chart of conventional operations for optimizing a cost function of a deep learning model using gradient descent.

FIG. 2 is a flow chart of conventional operations 200 for training a deep learning model by optimizing a cost function of the deep learning model using a gradient descent-based method.

Operations 200 begin at step 210, where a batch of data and a set of parameters are selected for training the deep learning model. Together the batch of data from a source of training data and the parameters are provided to the deep learning model in order to allow training of the deep learning model. The parameters become a part of the deep learning model and affect how the deep learning model processes and interprets data. The batch of data may be of a size sufficient to produce enough output to fairly judge the quality of that output.

At step 220, predicted output for the batch of data is generated based on a provided set of parameters.

At step 230, a cost function of the deep learning model is evaluated based on the output generated by the deep learning model compared to "ground truth" (e.g., known value) output. Generally, a lower cost (or loss) from the cost function indicates better output.

At step 240, it is determined if a termination condition of the training has been met. For example, a termination condition may include diminishing improvements in cost compared to previous iterations, or reaching a certain number of iterations executed. Training may also be terminated if it is determined that the cost, as determined by the evaluation of the cost function, is sufficiently low. Low cost is desirable because it indicates that the output is closely in line with the expected output for a batch of training data. Cost may be sufficiently low as determined by the operator of the deep learning system. The cutoff point for sufficiently low cost is arbitrary but a lower cost indicates that the output is better, so costs as low as feasible are preferred.

If the termination condition has been met, operations 200 proceed to step 270, where training of the deep learning model is complete. Otherwise, operations 200 proceed to step 250. Generally, a deep learning model will not be properly trained after a single batch of training data and may require many iterations to be completely trained, for example, to produce output with a low enough cost to be considered trained.

At step 250, proxy optimization of the deep learning model, by optimizing the cost function, begins by performing gradient descent on the cost function for the parameter or set of parameters used by the deep learning model. Gradient descent involves determining the gradient of the cost function for a given parameter and a given input, and incrementally modifying the parameter and re-determining the gradient for that parameter. By so doing, a parameter value that would result in a better, that is, lower cost, output can be determined. Other inputs to the cost function are not changed during gradient descent. A formula representation of gradient descent is as follows, where $\lambda$ is the step size used, $\vec{x}_i$ is a current value of a component of $\vec{x}$, and $\vec{x}_{i+1}$ is a next value of $\vec{x}_i$:

$$\vec{x}_{i+1} = \vec{x}_i - \lambda \nabla f(\vec{x}_i)$$

At step 260, the parameters are updated based on the performed gradient descent and a next batch of data is selected for the deep learning model. Operations 200 then return to step 220 where a next set of predicted data is generated by the deep learning model. This process then iterates training the deep learning model, evaluating the output of the deep learning model, optimizing the cost function and updating deep learning model, etc., until the deep learning model produces sufficiently low-cost output.

Figure 3:
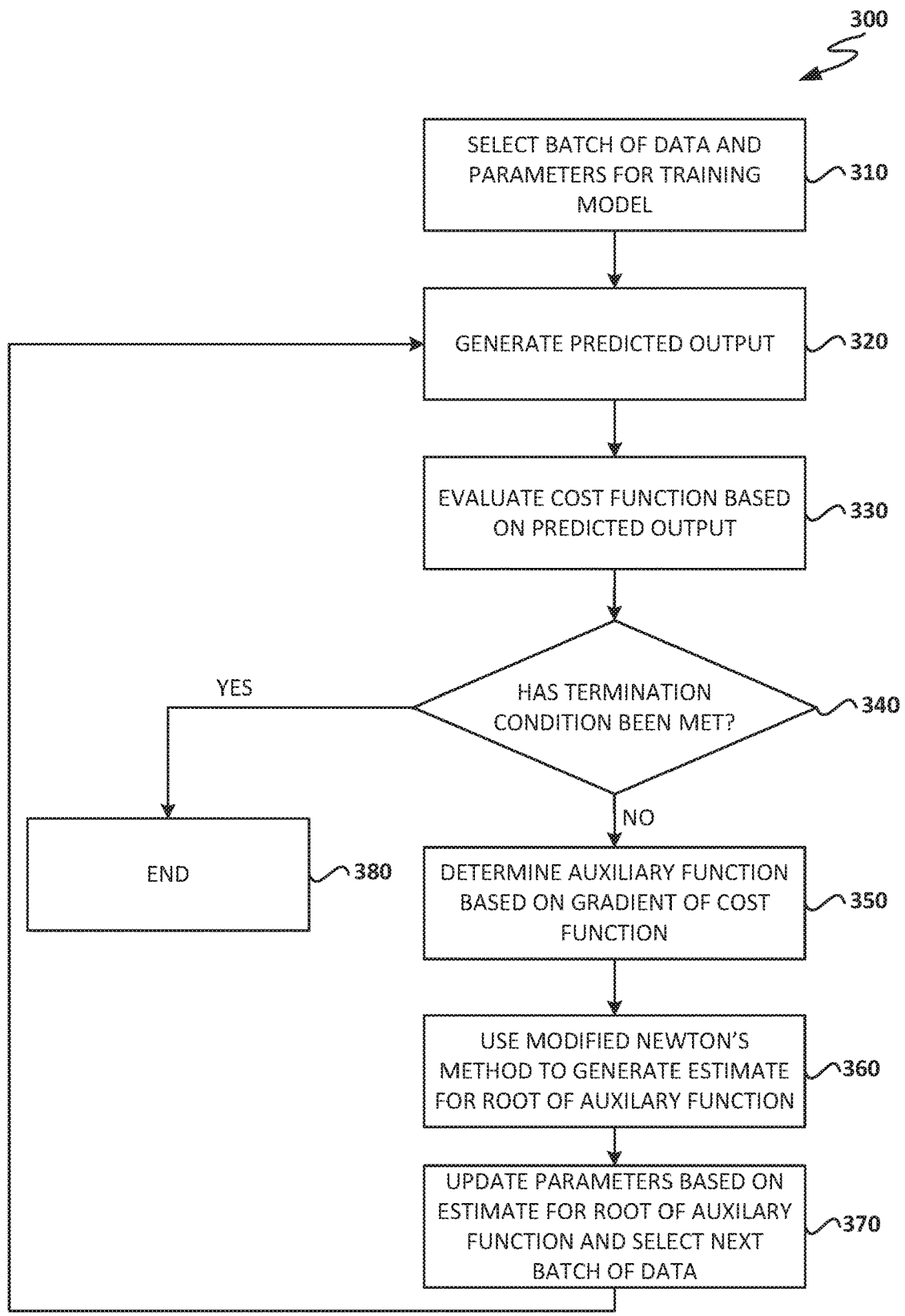
FIG. 3 is a flow chart of example operations for optimizing a cost function of a deep learning model using an auxiliary function and a modified Newton's method.

FIG. 3 is a flow chart of example operations 300 for optimizing a cost function of a deep learning model using an auxiliary function and a modified Newton's method. Operations 300 begin at step 310, where a batch of training data and parameters are selected for training a deep learning model. The size of the batch and the exact parameters chosen may be left up to the discretion of the operator of the deep learning model.

In this example, the deep learning model is trained using batches of training data. Training of the deep learning model may involve categorizing or identifying a set of training data. If so, output may be a set of classifications or identifications corresponding to the batch of training data. Training data may be stored remotely from a computing device executing the deep learning model. For example, training data may be stored in a remote training data repository accessible via a network connection.

At step 320, the training data is run through the deep learning model, which produces predicted output.

At step 330, a cost function of the deep learning model is evaluated based on a comparison of the predicted output to the desired output. In the example of classifying input data, evaluation of output by the cost function may include comparing a classification given to a particular element of data by the deep learning model with a known classification.

The cost function takes as input the parameters used to set up the deep learning model. That is, the cost function is used to determine, based on the parameters used for the deep learning model and the predicted output produced by the deep learning model, how far from the desired result the predicted output produced was.

At step 340, it is determined if a termination condition of the training has been met. If the termination condition has been met, operations 300 proceed to step 380, where training of the deep learning model is complete. Otherwise, operations 300 proceed to step 350.

At step 350, an auxiliary function is determined based on a gradient of the cost function. A gradient is a multi-variable (or vector) value. An auxiliary function constructed based on the gradient may have roots corresponding to points along the cost function where the gradient is zero, which may in-turn correspond to minimum points of the cost function. Roots of the auxiliary function may be easier to identify compared to minimum points of the cost function.

In some examples, the auxiliary function may be found by computing the inner product of the gradient of the cost function. The inner product of a vector (such as the gradient) is the sum of the squares of all the components of the vector. In other examples, the auxiliary function is a magnitude (or the square root of the inner product) of the gradient of the cost function (e.g., the square root of the sum of the squares of all of the components of the gradient of the cost function). In yet another example, the auxiliary function is the natural logarithm of the magnitude of the gradient of the cost function. Other potential auxiliary functions are possible. For example, any monotonically increasing function may be applied to the inner product of the cost function to produce a suitable auxiliary function.

At step 360, a modified Newton's method is applied to the auxiliary function, in order to estimate roots of the auxiliary function. The standard version of Newton's method is a process for iteratively finding the roots of single input functions. In general, it is performed by calculating successively closer roots of a given function by subtracting, from a first guess at the root, a value representing the output of the function at the guess divided by the derivative of the function at the guess. The value resulting from this subtraction is then used as a next guess, and the process is repeated until a value which results in the output of the function being zero (or sufficiently close to zero) is found.

A multi-variable version of Newton's method exists for finding roots of functions with multiple input variables; however, the existing multi-variable version of Newton's method is numerically unstable when calculated on most computing devices owing to inherent limitations in how many significant digits of a number can be stored in a computer's processor and memory.

A modified Newton's method that is numerically stable may be used to find roots of functions with multiple inputs without the drawbacks associated with conventional methods. A formula representation of the modified Newton's method is as follows, where $J(\vec{x})$ is the Jacobian matrix of $f(\vec{x})$ evaluated at $\vec{x}$, $\vec{x}_i$ is a current value of a component of $\vec{x}$, and $\vec{x}_{i+1}$ is a next value of $\vec{x}_i$:

$$\vec{x}_{i+1} = \vec{x}_i - \frac{1}{2} \frac{(\nabla f(\vec{x}_i))^2}{(J(\vec{x}_i)\nabla f(\vec{x}_i))^2} J(\vec{x}_i)\nabla f(\vec{x}_i)$$

In the equation above, J is defined by the following equation. In the following equation, subscripts preceding a vector indicate components of vectors. That is, $_i x$ is the $i^{th}$ component of x and $_j f$ is the $j^{th}$ component of f.

$$J = \begin{vmatrix} \frac{\partial_1 f}{\partial_1 x} & \frac{\partial_1 f}{\partial_2 x} & \cdots & \frac{\partial_1 f}{\partial_n x} \\ \frac{\partial_2 f}{\partial_1 x} & \frac{\partial_2 f}{\partial_2 x} & \cdots & \frac{\partial_2 f}{\partial_n x} \\ \vdots & \vdots & \ddots & \vdots \\ \frac{\partial_n f}{\partial_1 x} & \frac{\partial_n f}{\partial_2 x} & \cdots & \frac{\partial_n f}{\partial_n x} \end{vmatrix}$$

Computation of roots of the auxiliary function using the modified Newton's method is numerically stable. Numerical stability is important to implementation on computing devices. Numerical instability indicates that the computation or calculation is unsuitable for a computer processor, as rounding errors introduced by the processor will result in an inadequate or unusable final result. In a deep learning system, numerical instability introduces errors that make optimizing a deep learning model more difficult.

Although in this example the modified Newton's method is used to calculate the roots of the auxiliary function, other methods of calculating roots of an auxiliary function are possible. It may be noted that both gradient descent and use of a method utilizing an auxiliary function based on a gradient of the cost function may require successive iterative calculations. Although both require iterative calculations, the method utilizing an auxiliary function is a more efficient process and may approach a minimum point of a cost function more quickly (that is, with less iterations) than gradient descent.

At step 370, the roots identified at step 360 are used to update the parameters of the deep learning model, and a new batch of training data is selected. Operations 300 then proceed back to step 320, where the deep learning model is executed.

The above described operations present a method of training a deep learning model that is more efficient than the traditional method described with respect to FIG. 2. In particular, the repetitive calculations required by the gradient descent-based optimization are avoided. As a result, machine learning systems making use of methods such as described with respect to FIG. 3 may be able to train machine learning models more quickly and more efficiently as compared to conventional methods. Increased efficiency and decreased training time may lead to improved machine learning model performance as training can be completed with less time and money spent.

Figure 4:
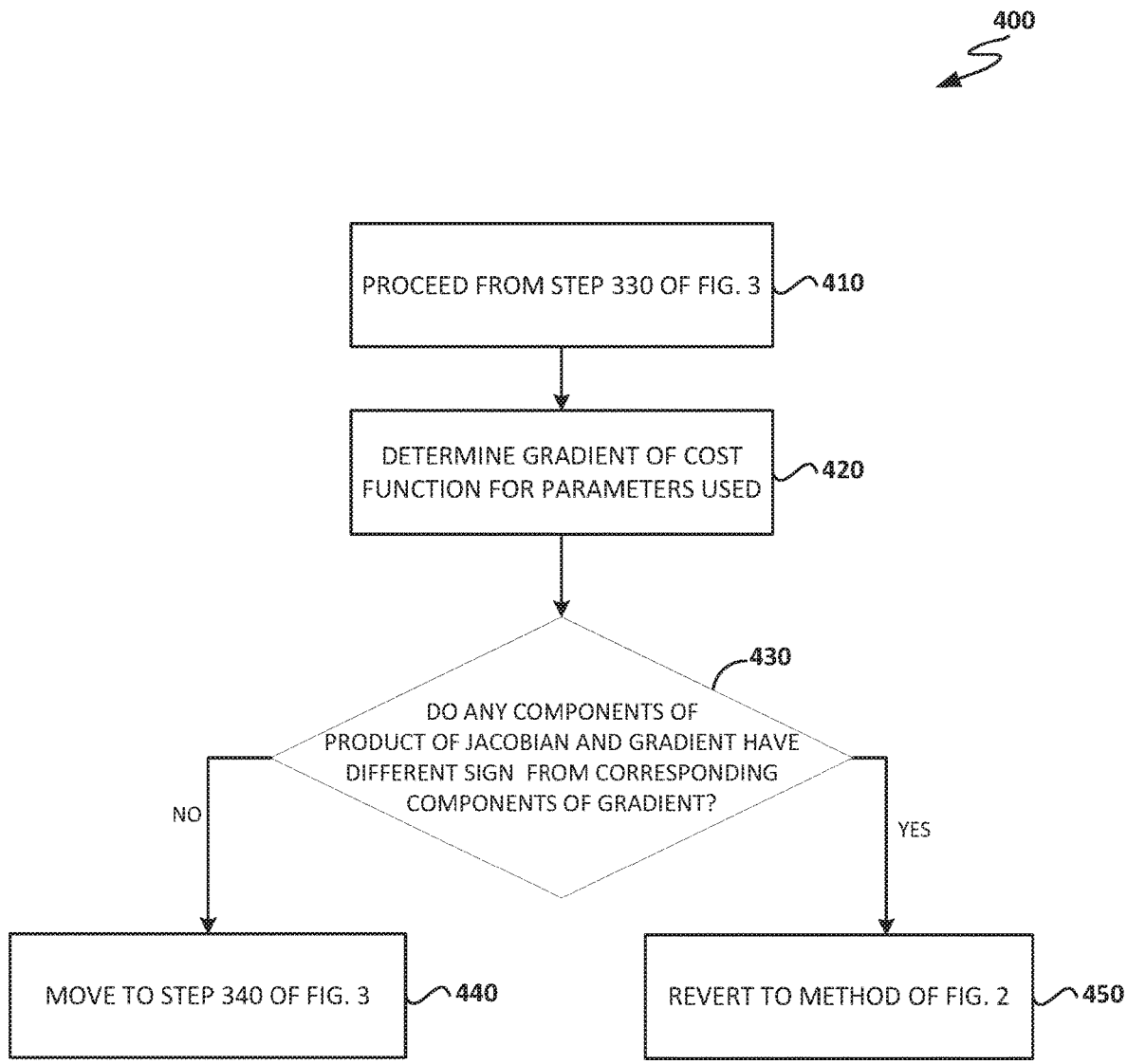
FIG. 4 is a flow chart of example operations for avoiding local maximum points while optimizing cost functions.

FIG. 4 is a flow chart of example operations 400 for avoiding local maximum points and saddle points while optimizing cost functions. Operations 400 may be combined with the operations described with respect to FIG. 3. In particular, operations 400 begin at step 410, and may take place between steps 330 and 340 of FIG. 3.

At step 420, a gradient of the cost function is determined for the parameters used in the deep learning model. The gradient can be used in a calculation to determine if use of the method described in FIG. 3 will approach a local maximum point or a saddle point of the cost function rather than a local minimum. Such a method frequently finds a root that corresponds with a minimum point of the cost function, which is the desired point for optimization purposes. However, as the method finds the nearest zero gradient point, it is possible that a root of the auxiliary function corresponds to a maximum point, or a saddle point, where the cost function briefly flattens, instead. Maximum points and saddle points have little utility for optimization purposes. Thus is may be desirable to cease use of the method if it can be determined that the method is moving towards a maximum point or a saddle point rather than a minimum point.

At step 430, a calculation is performed using the gradient and a Jacobian matrix J, as defined above with respect to FIG. 3. First, a product of the gradient and J is calculated. The product is then compared with the gradient itself, to determine if any components of the product have differing signs from any corresponding components of the gradient. That is, it is determined if any components of the product $J(\vec{x})\nabla f(\vec{x})$ have differing signs with a corresponding component of $\nabla f(\vec{x})$. This calculation may be used to determine if the method of FIG. 3 is moving towards a local minimum point on the one hand, or a local maximum point or a saddle point on the other. If all corresponding components have the same sign, the method is moving towards a minimum point, while if any of the signs of corresponding components differ, the method is moving towards a maximum point or a saddle point. If all corresponding components have the same sign, operations 400 proceed to step 440, where the operations of FIG. 3 are resumed at step 340. If any of the signs of corresponding components differ, operations proceed to step 450, where the method reverts back to the conventional method described with respect to FIG. 2.

While the conventional method of FIG. 2 involves potentially inefficient gradient descent calculations, the conventional method may be useful in deep learning systems as a fallback or fail safe that may be used in certain situations or with oddly behaving deep learning models or cost functions. In particular, conventional gradient descent may be useful when a modified Newton's method approaches a local maximum point or a saddle point rather than a local minimum point for a cost function. However, in most situations, the methods described herein train deep learning systems more efficiently, that is, with less use of processing time or processing resources.

Figure 5:
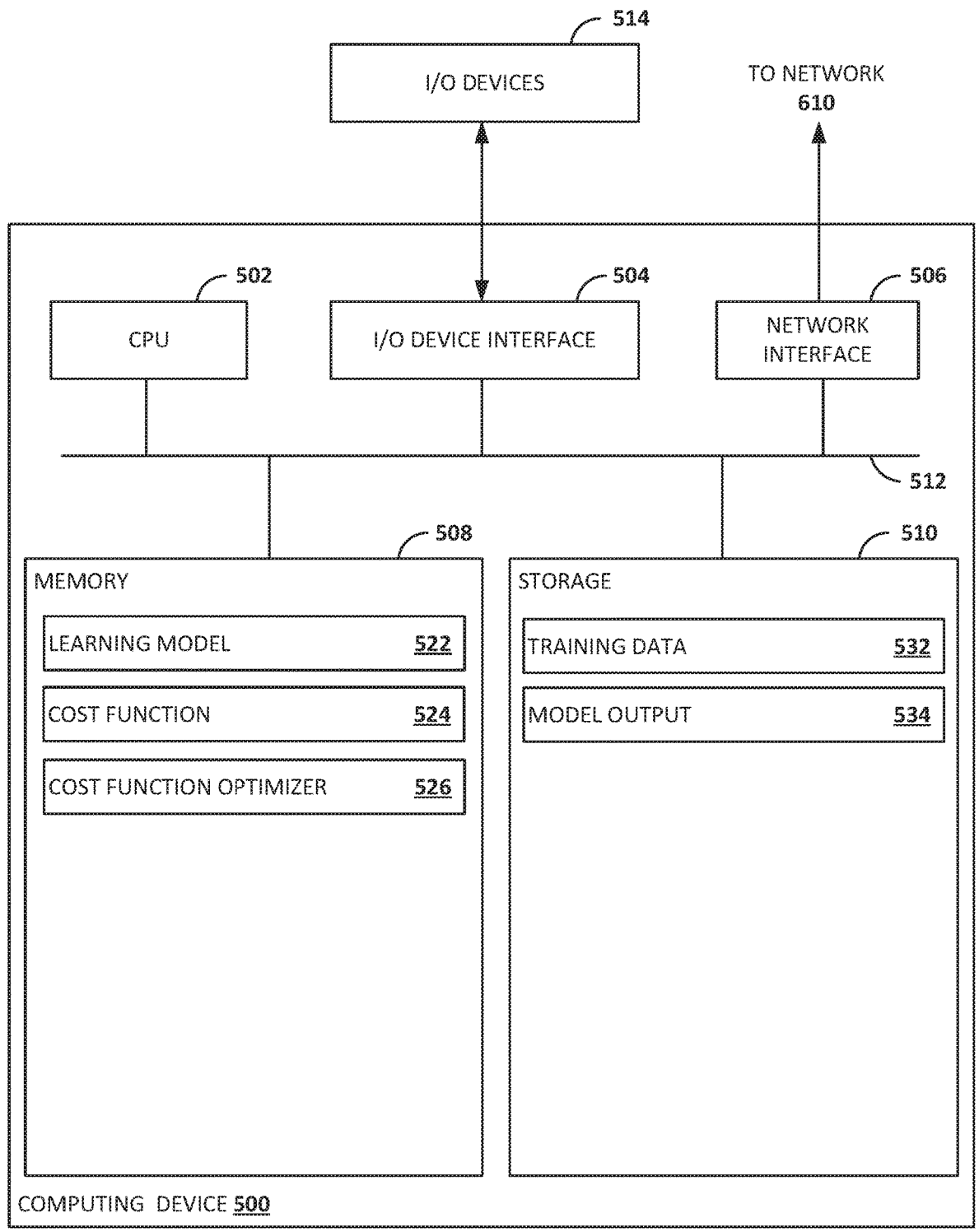
FIG. 5 is a block diagram of an example computing device for executing a deep learning model.

FIG. 5 is a block diagram of an example computing device 500 executing a deep learning model. As shown, computing device 500 includes a central processing unit (CPU) 502, one or more input/output (I/O) device interfaces 504, which may allow for the connection of various I/O devices 514 (e.g., keyboards, displays, mouse devices, pen input, etc.) to computing device 500, a network interface 506, a memory 508, a storage 510, and an interconnect 512.

CPU 502 may retrieve and execute programming instructions stored in memory 508. Similarly, CPU 502 may retrieve and store application data residing in memory 508. Interconnect 512 transmits programming instructions and application data, among CPU 502, I/O device interface 504, network interface 506, memory 508, and storage 510. CPU 502 is included to be representative of a single CPU, multiple CPUs, a single CPU having multiple processing cores, and the like. I/O device interface 504 may provide an interface for capturing data from one or more input devices integrated into or connected to computing device 500, such as keyboards, mice, touchscreens, and so on. Memory 508 may represent a random access memory (RAM), while storage 510 may be a solid state drive, for example. Although shown as a single unit, storage 510 may be a combination of fixed and/or removable storage devices, such as fixed drives, removable memory cards, network attached storage (NAS), or cloud-based storage.

As shown, memory 508 includes learning model 522, cost function 524, and cost function optimizer 526, such as described above with respect to FIGS. 3-4.

As shown, storage 510 includes training data 532 and model output 534. In this example training data 532 is stored locally with learning model 522. In other examples, training data may be obtained over a network, such as network 610, through network interface 506. Model output 534 is generated by learning model 522 and analyzed by cost function 524 in order to more fully train learning model 522.

Example Machine Learning Usage

One potential usage for machine learning models is the identification of subjects in images. Machine learning models may be applied to this task in order to reduce manual identification activity, and, if well trained, may be able to identify subjects in images with greater accuracy than possible by manual identification. In one particular example, a machine learning model may be used as part of a tax preparation application. In such an example, a machine learning model may be used to identify images of forms submitted by users, and extract data from those images to expedite the tax preparation process. In this example, accuracy is desirable, to produce accurate tax information.

A machine learning model for use in a tax preparation application may be trained with a variety of sample images. The sample images may include different types of forms as well as other unrelated images. A machine learning model should be able to differentiate between the relevant images (e.g., forms) and the unrelated images. An operator of the machine learning model will typically select a batch of sample images to use, as well as a set of initial parameters used to run the machine learning model.

On a first run, the machine learning model will typically be somewhat inaccurate. Each run, the machine learning model produces a set of output, which in this example would be a set of classifications or identifications of the sample images. For example, given a set of two images, one depicting a tax form and one depicting a car, the machine learning model may produce a classification of each image as being either a particular tax form, or an unrelated non-tax form image.

When output is produced by running the machine learning model, a cost function may then be used to evaluate the output. A cost function typically compares the output of the machine learning model to expected or correct output. In this example, the correct output may be a name or label for each sample image. A first sample image may be of a 1040 form, and may be labeled as "1040".

In some examples, output the cost function may be expressed as a summation of the incorrect answers, that is, times when actual output for an image differ from correct output for that image. The cost function may also be expressed a mean squared error of the incorrect answers, or a variety of other statistical measures of the output. This difference is determined with respect to the parameters used in running the machine learning model. In this example, a correct result that does not add to cost would be if the machine learning model correctly identified the image depicting the tax form. An incorrect result that does add to cost would be if the machine learning model misidentified the unrelated image depicting the car as depicting a tax form. The goal of optimization is, in general, to locate a set of parameters for which the machine learning model would have correctly identified both images.

Minimum points of the cost function may identify a new set of parameters to use for the machine learning model. Optimizing the cost function to find these minimum points is therefore a significant operation in training a machine learning model. Methods using an auxiliary function based on a gradient of the cost function, such as described in FIG. 3, may be used to efficiently optimize cost functions of machine learning models.

When optimization is complete, the new parameters found are provided to the machine learning model, and the machine learning model is run again, this time with a new set of sample images. The machine learning model may be trained until the operator of the machine learning model determines training is complete. Typically, the machine learning model will be trained until it reaches a certain threshold of accuracy in identification.

Although the above methods and systems are described with respect to machine learning models or deep learning models specifically, the method of finding minimum points of functions with multiple inputs may be more broadly applicable. Generally, for any multiple-input function, extrema of the multiple-input function may be obtained by calculating a gradient of the multiple-input function for particular input, and generating an auxiliary function based on the gradient of the multiple-input function. As described above, roots of the auxiliary function correspond to extrema of the multiple-input function. Thus, any method that can identify roots of the auxiliary function (such as Newton's method or a modified Newton's method) may be used to calculate estimates of extrema of the multiple-input function.

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

What is claimed is:

1. A method for training a machine learning model, comprising:
   executing, via a processing apparatus comprising a processor and a memory, the machine learning model;
   providing an input to the machine learning model based on training data comprising:
      the input; and
      a ground truth label representing a known correct output;
   receiving an output from the machine learning model in response to the input;
   evaluating a cost function that compares the output from the machine learning model to the ground truth label representing the known correct output;
   determining a gradient of the cost function;
   generating an auxiliary function based on an inner product of the gradient, wherein the inner product of the gradient comprises a sum of squares of a plurality of components of the gradient, wherein the gradient has a vector output and the auxiliary function has a scalar output, and wherein the plurality of components of the gradient comprise values corresponding to a plurality of dimensions of a vector;
   calculating, using the processor, a root of the auxiliary function corresponding to a minimum point of the cost function, wherein the calculating of the root is numerically stable and suitable for the processor as a result of the scalar output of the auxiliary function; and
   updating one or more parameters of the machine learning model using a step size that is determined based on the root of the auxiliary function to produce a trained machine learning model.

2. The method of claim 1, wherein training the machine learning model does not require inverting a Jacobian matrix of the gradient to iteratively estimate the minimum point of the cost function.

3. The method of claim 1, wherein identifying the root of the auxiliary function comprises applying a modified Newton's method to the auxiliary function.

4. The method of claim 1, further comprising:
   determining the root of the auxiliary function corresponds with a local maximum or a saddle point of the cost function; and
   identifying the minimum point of the cost function using a conventional gradient descent technique.

5. The method of claim 1, further comprising, prior to executing the machine learning model, obtaining the training data for the machine learning model.

6. A system comprising:
   a memory including computer executable instructions; and
   a processor configured to execute the computer executable instructions and cause the system to perform operations for training a machine learning model using a cost function, the operations comprising:
      executing, via the system, the machine learning model;
      providing an input to the machine learning model based on training data comprising:
         the input; and
         a ground truth label representing a known correct output;
      receiving an output from the machine learning model in response to the input;
      evaluating a cost function that compares the output from the machine learning model to the ground truth label representing the known correct output;
      determining a gradient of the cost function;
      generating an auxiliary function based on an inner product of the gradient, wherein the inner product of the gradient comprises a sum of squares of a plurality of components of the gradient, wherein the gradient has a vector output and the auxiliary function has a scalar output, and wherein the plurality of components of the gradient comprise values corresponding to a plurality of dimensions of a vector;
      calculating, using the processor, a root of the auxiliary function corresponding to a minimum point of the cost function, wherein the calculating of the root is numerically stable and suitable for the processor as a result of the scalar output of the auxiliary function; and
      updating one or more parameters of the machine learning model using a step size that is determined based on the root of the auxiliary function to produce a trained machine learning model.

7. The system of claim 6, wherein training the machine learning model does not require inverting a Jacobian matrix of the gradient to iteratively estimate the minimum point of the cost function.

8. The system of claim 6, wherein identifying the root of the auxiliary function comprises applying a modified Newton's method to the auxiliary function.

9. The system of claim 6, the operations further comprising:
   determining the root of the auxiliary function corresponds with a local maximum or a saddle point of the cost function; and
   identifying the minimum point of the cost function using a conventional gradient descent technique.

10. The system of claim 6, the operations further comprising, prior to executing the machine learning model, obtaining the training data for the machine learning model.

11. A non-transitory computer-readable medium having instructions stored thereon which, when executed by a processor of a computing device, perform operations for training a machine learning model using a cost function, the operations comprising:
   executing, via the computing device, the machine learning model;
   providing an input to the machine learning model based on training data comprising:
      the input; and
      a ground truth label representing a known correct output;
   receiving an output from the machine learning model in response to the input;
   evaluating a cost function that compares the output from the machine learning model to the ground truth label representing the known correct output;
   determining a gradient of the cost function;

generating an auxiliary function based on an inner product of the gradient, wherein the inner product of the gradient comprises a sum of squares of a plurality of components of the gradient, wherein the gradient has a vector output and the auxiliary function has a scalar output, and wherein the plurality of components of the gradient comprise values corresponding to a plurality of dimensions of a vector;

calculating, using the processor, a root of the auxiliary function corresponding to a minimum point of the cost function, wherein the calculating of the root is numerically stable and suitable for the processor as a result of the scalar output of the auxiliary function; and updating one or more parameters of the machine learning model using a step size that is determined based on the root of the auxiliary function to produce a trained machine learning model.

12. The computer-readable medium of claim 11, wherein identifying the root of the auxiliary function comprises applying a modified Newton's method to the auxiliary function.

13. The computer-readable medium of claim 11, the operations further comprising:

determining the root of the auxiliary function corresponds with a local maximum or a saddle point of the cost function; and identifying the minimum point of the cost function using a conventional gradient descent technique.

* * * * *